United States Patent
Grote et al.

(10) Patent No.: US 12,181,279 B2
(45) Date of Patent: Dec. 31, 2024

(54) OPTICAL DEVICE FOR HETERODYNE INTERFEROMETRY

(71) Applicant: Chamartin Laboratories LLC, Wilmington, DE (US)

(72) Inventors: Richard Grote, Rancho Cucamonga, CA (US); Jeffrey Driscoll, San Jose, CA (US); Alexander Gondarenko, San Jose, CA (US)

(73) Assignee: CHAMARTIN LABORATORIES LLC, Wilmington, DE (US)

( * ) Notice: Subject to any disclaimer, the term of this patent is extended or adjusted under 35 U.S.C. 154(b) by 152 days.

(21) Appl. No.: 17/757,037

(22) PCT Filed: Dec. 11, 2020

(86) PCT No.: PCT/IB2020/000999
§ 371 (c)(1),
(2) Date: Jun. 8, 2022

(87) PCT Pub. No.: WO2021/116751
PCT Pub. Date: Jun. 17, 2021

(65) Prior Publication Data
US 2023/0019946 A1 Jan. 19, 2023

Related U.S. Application Data

(60) Provisional application No. 63/060,581, filed on Aug. 3, 2020, provisional application No. 63/016,897, filed
(Continued)

(51) Int. Cl.
*G01B 9/02056* (2022.01)
*G01B 9/02* (2022.01)
(Continued)

(52) U.S. Cl.
CPC ..... *G01B 9/02057* (2013.01); *G01B 9/02007* (2013.01); *G01B 9/02051* (2013.01);
(Continued)

(58) Field of Classification Search
CPC ............ G01B 9/02004; G01B 9/02007; G01B 9/02051; G01B 9/02057; G02B 6/29349
See application file for complete search history.

(56) References Cited

U.S. PATENT DOCUMENTS

| 3,443,871 A | 5/1969 | Chitayat |
| 5,396,328 A * | 3/1995 | Jestel ................. G01B 9/02028 |
| | | 356/482 |

(Continued)

FOREIGN PATENT DOCUMENTS

| DE | 38 25 606 A1 | 4/1990 |
| EP | 0 422 143 A1 | 4/1991 |
| JP | 62005105 A | 1/1987 |

OTHER PUBLICATIONS

Cole, D. B. et al., "Integrated heterodyne interferometer with on-chip modulators and detectors", Optics Letters, Jun. 25, 2015, pp. 3097-3100, vol. 40, No. 13, Optical Society of America.
(Continued)

*Primary Examiner* — Michael A Lyons
(74) *Attorney, Agent, or Firm* — Brownstein Hyatt Farber Schreck, LLP

(57) ABSTRACT

The invention refers to an optical device for heterodyne interferometry, comprising a chip, a beam splitter, a first waveguide arranged on the chip, light propagating in the first waveguide being guided to the beam splitter, a second waveguide arranged on the chip, light propagating in the second waveguide being guided to and/or from the beam splitter, wherein the beam splitter, the first waveguide, and the second waveguide form part of a Michelson interferometer, wherein the first waveguide and the second waveguide
(Continued)

at least partially form two arms of the Michelson interferometer, and wherein two further arms of the Michelson interferometer are at least partially arranged outside the chip.

23 Claims, 2 Drawing Sheets

Related U.S. Application Data on Apr. 28, 2020, provisional application No. 62/946,860, filed on Dec. 11, 2019, provisional application No. 62/946,813, filed on Dec. 11, 2019, provisional application No. 62/946,929, filed on Dec. 11, 2019.

(51) Int. Cl.
  *G01B 9/02001* (2022.01)
  *G01K 1/14* (2021.01)
  *G02B 6/293* (2006.01)
  *G02F 1/21* (2006.01)
  *G02F 1/225* (2006.01)

(52) U.S. Cl.
  CPC ........... *G01K 1/14* (2013.01); *G02B 6/29349* (2013.01); *G02F 1/212* (2021.01); *G02F 1/225* (2013.01)

(56) References Cited

U.S. PATENT DOCUMENTS

| | | | |
|---|---|---|---|
| 9,494,567 B2 | 11/2016 | Islam | |
| 2002/0015155 A1* | 2/2002 | Pechstedt | G01B 9/0209 356/477 |
| 2006/0290943 A1* | 12/2006 | Sun | G01B 9/02027 356/498 |
| 2010/0259760 A1 | 10/2010 | Karrai | |
| 2014/0125983 A1* | 5/2014 | Nitkowski | G01J 9/02 356/450 |
| 2018/0238794 A1 | 8/2018 | Kangas et al. | |
| 2019/0257640 A1* | 8/2019 | Avci | G01B 9/02027 |
| 2019/0346568 A1* | 11/2019 | Feng | H01L 25/167 |

OTHER PUBLICATIONS

International Search Report and Written Opinion of the International Searching Authority, mailed Apr. 6, 2021, corresponding to PCT/IB2020/000999, 22 pages.

Izutsu, M. et al., "Integrated Optical SSB Modulator/Frequency Shifter", IEEE Journal of Quantum Electronics, Nov. 1, 1981, p. 2225, vol. QE-17, No. 11, IEEE.

Karlsson, C.J. et al., "All-fiber multifunction continuous-wave coherent laser radar at 1.55 μm for range, speed, vibration, and wind measurements", Applied Optics, Jul. 20, 2000, pp. 3716-3726, vol. 39, No. 21, Optical Society of America.

Poulton, C.V. et al., "Frequency-modulated Continuous-wave LIDAR Module in Silicon Photonics", OFC, Jan. 2016, 4 pages, Optical Society of America.

Schneider, S. et al., "Optical coherence tomography system mass-producible on a silicon photonic chip", Optics Express, Jan. 20, 2016, pp. 1573-1586, vol. 24, No. 2, Optical Society of America.

Shimotsu, S. et al., "Single Side-Band Modulation Performance of a LiNbO$_3$ Integrated Modulator Consisting of Four-Phase Modulator Waveguides", IEEE Photonics Technology Letters, Apr. 2001, pp. 364-366, vol. 13, No. 4, IEEE.

Website : "Michelson interferometer", Wikipedia, page last edited on Jun. 27, 2019, page printed on Jul. 2, 2019, 12 pages, Wikimedia Foundation, Inc., https://en.wikipedia.org/wiki/Michelson_interferometer.

Zappe, H. P. et al., "A Monolithic Optical Displacement Measurement Microsystem", Proceedings of the 9$^{th}$ Annual International Workshop on Micro Electro Mechanical Systems, Investigation of Micro Structures, Sensors, Actuators, Machines and Systems, San Diego, California, Feb. 11, 1996, pp. 400-405, IEEE.

* cited by examiner

OPTICAL DEVICE FOR HETERODYNE INTERFEROMETRY

CROSS-REFERENCE TO RELATED APPLICATION(S)

This application is a U.S. national stage entry, under 35 U.S.C. § 371, of International Application Number PCT/IB2020/000999, filed on Dec. 11, 2020, which claims priority to and the benefit of U.S. Provisional Application No. 62/946,813, filed Dec. 11, 2019, U.S. Provisional Application No. 62/946,860, filed Dec. 11, 2019, U.S. Provisional Application No. 62/946,929, filed Dec. 11, 2019, U.S. Provisional Application No. 63/016,897, filed Apr. 28, 2020, and U.S. Provisional Application No. 62/060,581, filed Aug. 3, 2020. The entire contents of all of the applications identified in this paragraph are incorporated herein by reference.

FIELD

One or more aspects of embodiments according to the present invention relate to an optical device for heterodyne interferometry, and more particularly to an optical device for heterodyne interferometry having first waveguide and a second waveguide.

BACKGROUND

Coherent optical measurements that may be used for LiDAR and remote sensing rely on heterodyne interferometry whereby a laser beam (referred to as the local oscillator) is mixed with a much weaker probe beam to create a beat tone signal at RF or microwave frequencies. Some related art systems use an on-chip directional coupler to mix the probe and local oscillator signals, resulting in beat tone signal degradation caused by phase noise between the on-chip local oscillator and probe paths.

SUMMARY

Accordingly, the present invention aims to solve the above problems by the optical devices described herein.

According to a first aspect, an optical device for heterodyne interferometry comprises a chip, a beam splitter, a first waveguide arranged on the chip, and a second waveguide arranged on the chip. Light that propagates in the first waveguide is guided to the beam splitter. Light that propagates in the second waveguide is guided to and/or from the beam splitter. The beam splitter, the first waveguide, and the second waveguide form part of a Michelson interferometer. The first waveguide and the second waveguide at least partially form two arms of the Michelson interferometer and two further arms of the Michelson interferometer are at least partially arranged outside the chip.

In this way, an improved optical device for heterodyne interferometry is provided to mitigate or solve the problem of beat tone signal degradation for integrated optical heterodyne detection methods that, in other configurations, may be caused by on-chip phase noise experienced by separate local oscillators and probe beam paths. The provision of the first waveguide and the second waveguide on the chip not only reduces the phase noise but also provides a compact design of the optical device for heterodyne interferometry. In particular, as two arms of the Michelson interferometer are arranged off-chip, the dimensions of the chip can be made small. Various optical components may be integrated in the chip and/or are arranged on the chip.

Optional features of the invention will now be set out. These are applicable singly or in any combination with any aspect of the invention.

The beam splitter may arranged on the chip, wherein preferably the beam splitter is a facet of a waveguide arranged on the chip.

The optical device may further comprise a light source coupled to the first waveguide, wherein preferably the light source is arranged on the chip and/or the light source is configured to generate light having time-varying wavelength.

The optical device may further comprise a coupler, preferably a Y-branch coupler, wherein the coupler is configured to couple the light of the first waveguide and the second waveguide, and wherein the coupled light of the first waveguide and the second waveguide is guided to and/or from the beam splitter.

The optical device may further comprise a common waveguide coupled to the coupler and arranged on the chip, wherein preferably the beam splitter is a facet of the common waveguide.

The optical device may further comprise a photodetector coupled to the second waveguide, wherein preferably the photodetector is arranged on the chip.

The first waveguide and the second waveguide may fuse at the beam splitter.

The beam splitter may be a facet of the first waveguide and/or the second waveguide, wherein preferably the facet is inclined to a direction of extension of the first waveguide.

The optical device may further comprise a reflector coupled to the second waveguide and/or a photodetector, wherein preferably the photodetector is arranged to receive light from the second waveguide.

The reflector may be arranged on the chip, wherein preferably the reflector is a distributed Bragg reflector (DBR).

The optical device may further comprise a sample lens configured to focus and/or direct light from the first waveguide onto a sample, wherein preferably the sample lens is arranged spaced apart from the chip.

The optical device may further comprise a photodetector coupled to the second waveguide and arranged on the chip.

The optical device may further comprise a first lens configured to focus light coming from the first waveguide onto a sample and a second lens configured to focus light backscattered from the sample into the second waveguide, wherein preferably the first lens and/or the second lens are arranged spaced apart from the chip.

Further optional features of the invention are set out below.

BRIEF DESCRIPTION OF THE DRAWINGS

Embodiments of the invention will now be described by way of example with reference to the accompanying drawings in which.

DETAILED DESCRIPTION

Figure 1:
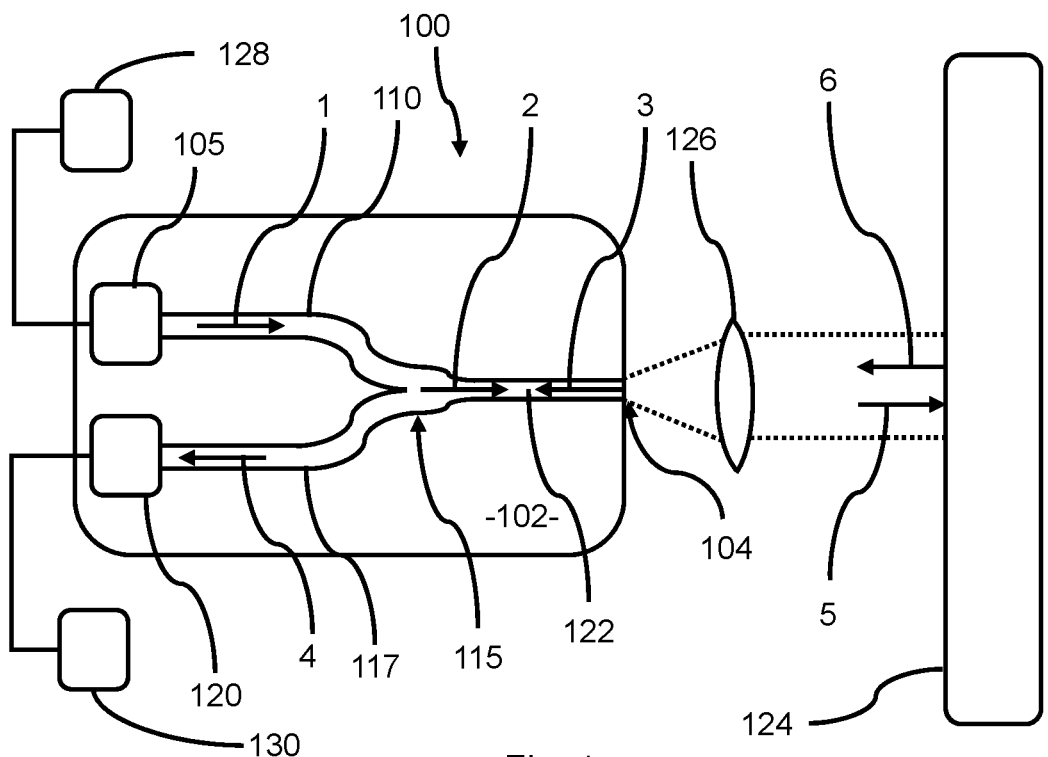
FIG. 1 is a schematic representation of an optical device for heterodyne interferometry according to a first embodiment of the present invention.

The detailed description set forth below in connection with the appended drawings is intended as a description of exemplary embodiments of a sensing module provided in accordance with the present invention and is not intended to represent the only forms in which the present invention may be constructed or utilized.

In some embodiments, the optical device may be used for optical heterodyne interferometry. Optical heterodyne interferometry is a method of extracting information encoded as modulation of the phase and/or frequency of electromagnetic radiation, for example in the wavelength band of visible or infrared light. The light signal is compared with standard or reference light from a "local oscillator" (LO) that has a fixed offset in frequency and/or phase from the signal if the latter carried null information. "Heterodyne" defines that more than one frequency of the electromagnetic radiation is used.

The comparison of the two light signals is accomplished by combining them in a photodetector. To this end, the photodetector may have a response that is linear in energy, and hence quadratic in amplitude of electromagnetic field. Typically, the two light frequencies are similar enough that their difference or beat frequency produced by the detector is in the radio or microwave band that can be processed by electronic means.

The optical device in conjunction with a sample to be analyzed forms a Michelson interferometer. A Michaelson interferometer is based on the principle that light coming from a light source is split into two arms by a beam splitter. Each of the two light beams in the two arms is reflected back to the beam splitter which combines the amplitude of the light beams for example by the superposition principle. The resulting interference pattern is usually directed to a photodetector or camera for detecting and analyzing the interference pattern. This redirection of the light from the beam splitter onto the photodetector may be considered as constituting a third arm, while the direction of the light beam from the light source to the beam splitter may be considered a fourth arm. Thus, Michaelson interferometers may be considered as including four arms.

The optical device may provide at least two arms of the Michaelson interferometer on the chip. One arm of the Michaelson interferometer may be light beam that is directed to the sample by the beam splitter. This arm may not entirely be on the chip. For example, this arm is completely outside the chip. Details will be discussed later.

The chip may be a waveguide silicon photonics (SiPh) platform or silicon on oxide chip (or silicon on insulator (SOI) chip). The first waveguide and/or the second waveguide may be waveguides that can handle high power with low loss. Such waveguides may have a height of between 0.5 microns and 5 microns (where, e.g., in a SiPh chip fabricated on an SOI wafer the height may be measured from the BOX layer (which may operate as a lower cladding layer) to the top of the waveguide, the direction of the measurement being perpendicular to the plane of the SOI wafer). For example, the optical chip may include a waveguide silicon photonics (SiPh) platform as the chip, with rib waveguides having a height of approximately 3 microns for the first and/or second waveguides.

The beam splitter is any device which is capable of splitting an incoming light beam, for example into two light beams with reduced power but the same frequency as the incoming light beam. The beam splitter may split the incoming light beam with respect to its intensity, amplitude or energy, but independent from its frequency or phase. For example, the incoming light beam is split in a transmitted light beam and a reflected light beam. The ratio between the intensity (amplitude or energy) of the transmitted light beam and the intensity (amplitude or energy) of the reflected light beam may be appropriately set by choosing the beam splitter. Preferably, the ratio between the intensity of the transmitted light beam and the intensity of the reflected light beam is independent of the wavelength. The beam splitter may include two triangular transparent (glass) prisms which are glued together at their base.

The light propagating in the first waveguide (or in other words: transmitted by the first waveguide) is guided (directed or routed) by the optical device in such a way that it impinges on the beam splitter, i.e. the light propagating in the first waveguide is split by the beam splitter. To this end, the first waveguide may be connected to the beam splitter. However, intermediate optical elements may be arranged between the end of the first waveguide and the beam splitter. For example, a further waveguide and/or other optical components may be arranged between the first waveguide and the beam splitter. Optionally, the light transmitted by the first waveguide may exit the first waveguide and travel through air to the beam splitter. As the first waveguide forms at least a part of an arm of the Michaelson interferometer, it is solely important that the light propagating in the first waveguide reaches the beam splitter and that the optical path between the end of the first waveguide and beam splitter remains constant, for example by setting a fixed distance between the beam splitter and the end of the first waveguide. The end of the first waveguide defines that point where the light propagating in the first waveguide exits the first waveguide.

The first waveguide forms at least a part of an arm of the Michaelson interferometer. Optionally, the first waveguide constitutes a complete arm of the Michaelson interferometer.

Similar remarks as raised in conjunction with the first waveguide equally apply to the second waveguide. The light or light beam propagating in (or in other words: transmitted by) the second waveguide needs to be guided by the optical device in such a way that it impinges on the beam splitter. The second waveguide forms at least a part of an arm of the Michaelson interferometer. Optionally, the second waveguide constitutes a complete arm of the Michaelson interferometer.

The light that is coupled into the first waveguide may come from a light source. The light from the first waveguide that is transmitted by the beam splitter (i.e. the non-reflected light) may be directed/guided/route to the sample to be analyzed. The light from the first waveguide that is reflected may be used as a reference light (contributing to the formation of the local oscillator) and coupled in one of the other arms.

The beam splitter may be arranged on the chip. The beam splitter is, as discussed above, that component which separates the arms of the Michaelson interferometer from each other. Thus, by arranging a beam splitter on the chip, two arms of the Michaelson interferometer may be completely arranged on the chip. This allows a compact design of at least two arms of the Michaelson interferometer.

The beam splitter may be a facet of a waveguide arranged on the chip. The beam splitter can be the facet of the first waveguide, the second waveguide and/or an additional waveguide arranged on the chip. Exemplary embodiments will be described later. Thus, a separate beam splitter does not need to be provided but can be constituted by a facet or end face of a waveguide. In addition, the spatial relation of the waveguide and beam splitter is fixed and can be easily set.

The beam splitter may be arranged on the edge of the chip such that the beam splitter may be an interface between the arms arranged on the chip and the arms external to (or outside) the chip. However, the invention is not limited thereto. The beam splitter may be arranged spaced apart from the edge of the chip. For example, parts of the arms of the Michaelson interferometer that also extend outside of the chip may be constituted by waveguides that are arranged on the chip. This may help to direct the light to the sample and/or collect light back scattered by the sample and guide it back to the beam splitter. For example, the ends of such waveguides are associated with lenses or other optical components for focusing and/or directing the light from the waveguides and/or into the waveguides.

The light coupled into the first waveguide may be generated by a light source which optionally is arranged on the chip. For example, the light source may be in direct contact with the first waveguide. However, the light source may be spaced apart from the first waveguide. For example other optical components may be arranged between the light source and the first waveguide. The arrangement of the light source on the chip provides a stable spatial relationship between the light source and the first waveguide; in particular, the optical path from the light source through the first waveguide remains constant. If the light source is in direct contact with the first waveguide, transmission losses due to reflections at interfaces between the light source and the first waveguide can be minimized.

In an alternative embodiment, the light source is arranged outside or external to the chip. For example, the light source may be on a separate chip. This allows the use of light sources which cannot be arranged on the chip due to the size or the dimensions.

The light source may include a laser, a light emitting diode (LED), or a superluminescent diode (SLED or SLD) and/or other incoherent sources. The light source may comprise a white light source with low coherence. In this case, the photodetector (to be described later) includes a moving mirror. The power output of the light source may be approximately 10 mW and in some embodiments upwards to 100 mW or more. In some embodiments, the laser is not a vertical-cavity surface-emitting laser (VC SEL). The laser may be a distributed feedback (DFB) laser (or a distributed Bragg reflector (DBR) laser, or a FP (Fabry Perot) laser), and may be tunable. The laser may be tunable over a relatively narrow range, for example simply to trim the wavelength in response to the natural wavelength drift of devices, or it may be tunable over a wider range in order to change the operating wavelength of the laser in response to the demands of the spectroscopy. The laser (which may be a III-V laser) may be placed by micro transfer printing (MTP). The laser source may be a phase modulated laser or a chirped laser, or a frequency-shifted laser. It is also possible that the laser light is phase-modulated by a chirped radio frequency signal.

The light generated by the light source may be varied in amplitude, phase, polarization, or in other optical properties or a combination of such optical properties. Any such variation with time of a property of the light may be referred to herein as "modulation" of the light. Generally, such variations may be regular or in a pattern giving rise to a data signal.

The light source may further include variable optical attenuators (VOAs) which control the power output of the light source and the relative powers of the individual wavelengths. The light source may also include a modulator and/or a shutter. The light modulating elements of the light source (e.g., VOAs, modulators, and shutters) may be configured to affect the light propagating in the first waveguide, e.g., modulating the phase or amplitude of the light (in the case of a modulator) or blocking the light (in the case of a shutter). In this case, the laser may not be a tunable laser as the modulation is performed by the light modulating elements which could be arranged between the laser and the first waveguide.

In particular, the light source is configured to generate light having a time-varying wavelength. Wavelength modulated light is often used for heterodyne interferometry so that a beat tone is created by the mixing of the light backscattered from the sample and the local oscillator signal, and the beat tone may be detected by a photodetector. As described above the wavelength modulation of the generated light may be done by the laser itself or an optical element arranged between a laser having a fixed wavelength and the first waveguide. The frequency of modulation of the wavelength may be in the radio frequency range and/or microwave frequency range.

The optical device may include—in one embodiment—a coupler which combines the light (or light beam) propagating in the first waveguide with the light (or light beam) propagating in the second waveguide. For example, the coupler may be a Y-branch coupler or a directional coupler. The coupler may be combiner. The coupler may be any (passive) optical component which is configured to combine the light from the first waveguide and the second waveguide, preferably independent of frequency, phase, and/or amplitude.

The coupler may be arranged on the chip, optionally between the first and second waveguides and the beam splitter. Thus, the light combined by the coupler (i.e. the light propagating in the first waveguide and the light propagating in the second waveguide) is combined and guided to the beam splitter. Thus, the light propagating in both the first waveguide and in the second waveguide impinges on the beam splitter. The coupler may be provided by fusing the first waveguide and the second waveguide.

Optionally, the coupler and the beam splitter are spaced apart and the light emitted by the coupler freely propagates from the coupler to the beam splitter. In such an embodiment, the beam splitter may be external to the chip and the coupler may be arranged on an edge of the chip. Thus, the coupler combines two arms of the Michaelson interferometer.

The coupler is also configured to split incoming light (light coming from the beam splitter) into the first waveguide and into the second waveguide. For example, the light from the beam splitter is split into the first waveguide and into the second waveguide. However, the coupler may be configured to direct incoming light (light coming from the beam splitter) solely into the second waveguide.

The optical device may also include a common waveguide that is arranged on the chip. However, the common waveguide may be arranged external to the chip; for example, only the coupler, the first waveguide and the second waveguide are arranged on the chip.

The common waveguide may be coupled to the coupler. For example, the common waveguide may be in direct contact to the coupler. Thus, in an optional embodiment, light that propagates on the chip solely propagates in waveguides, namely the first waveguide, the second waveguide and the third waveguide.

The beam splitter may be a facet of the common waveguide. For example, the axial end surface of the common waveguide may be the facet and acts as a beam splitter. The axial end surface of the common waveguide may be arranged perpendicular to the direction of propagation of the light within the common waveguide. In this case, light propagating in the common waveguide impinges perpendicular on the facet. The facet may act as a semi-transparent mirror at which a certain ratio of the impinging light is reflected and the rest of the impinging light is transmitted. The ratio of the intensity of the reflected light compared to the intensity of the transmitted light may be adjusted as appropriate, for example by applying a surface coating on the axial end face of the common waveguide such as a reflective coating. The facet may be an angled facet with respect to the direction of propagation of the light with in the common waveguide to control its reflectivity.

The facet may extend parallel to an edge of the chip and can be arranged on the edge of the chip. The common waveguide may extend perpendicular to the edge of the chip. Thus, an axial end face of the common waveguide coincides with the edge of the chip.

Light propagating in the first waveguide is coupled into the common waveguide and reflected by the beam splitter, in particular the facet of the common waveguide. The light reflected by the beam splitter propagates into the second waveguide via the coupler. Thus, the light propagating in the second waveguide may act as a local oscillator for the heterodyne interferometry.

The optical device may further comprise a photodetector. In an embodiment, the photodetector is coupled to the second waveguide. This means that light propagating in the second waveguide and coming from the coupler or the beam splitter impinges on the photodetector. The photodetector may be in direct contact with an axial end face of the second waveguide. In this case, the photodetector may be arranged on the chip. However, it is possible for the photodetector to be arranged external to the chip or outside of the chip. In this case, the light propagating in the second waveguide may exit the second waveguide and is guided to the photodetector by other optical components such as mirrors and/or optical fibers.

The photodetector may have one or more wavelength filters (or none). Detection may be direct or coherent with possible enhanced signal-to-noise ratio (SNR). Amplitude, phase, and/or frequency modulation of lasers can be available and can provide various information about the sample or enhance the SNR.

The photodetector may include an AC coupled photodiode or a focal plane array detector. The photodetector may include (e.g., consist of) one detector which detects incoming light from the second waveguide. In some embodiments, the photodetector includes one or more photodiodes, each detecting the light propagating in the second waveguide.

The photodetector may have a detection rate sufficient to detect amplitude variations having a frequency corresponding to the frequency of wavelength variation of the laser source. For example, the frequency of the wavelength variation of the laser source may be in the radio frequency range such that the photodetector is capable of detecting amplitude variations is in the radio frequency range.

The optical device may include a sample lens which includes one or more lenses and/or a lens system for directing the light coming from the beam splitter onto the sample. For example, the sample lens has a focal length corresponding to the distance between the beam splitter and the sample lens. Thus, the light beams coming from the sample lens and impinging on the sample are parallel to each other. In addition, incoming light beams, for example light back scattered at the sample, is focused onto the beam splitter.

Light coming from the first waveguide and transmitted by the beam splitter impinges on a sample to be analyzed. The back scattered light propagates to the beam splitter; the back scattered light may be focused by the sample lens or a different lens or lens system onto the beam splitter. Thereafter, the light propagates from the beam splitter to the coupler and into the second waveguide. The light backscattered from the sample interferes with the light reflected by the beam splitter on the photodetector providing the heterodyne interferometry measurement.

In an alternative embodiment, the first waveguide and the second waveguide intersect or fuse at the beam splitter. This means, the first waveguide and the second waveguide do not share common space except of the region immediately in front of the beam splitter. For example, the second waveguide is in contact with the first waveguide and in contact with the beam splitter. The beam splitter may be arranged to transmit/reflect light coming from both the first waveguide and the second waveguide. For example, light coming from the first waveguide may be reflected by beam splitter into the second waveguide.

The first waveguide and/or the second waveguide may be straight, i.e. do not have bends or curvatures. The second waveguide may be inclined with respect to the first waveguide by an angle $\alpha$, for example by 45°. In case of a bended or curved first and/or the second waveguide, the portions of the first waveguide and/or the second waveguide directly in contact with the beam splitter may be inclined with respect to one and other.

The beam splitter may be a facet of the first waveguide and/or the second waveguide. The first waveguide and the second waveguide may share a common facet. Optionally, the facet has a plane surface. As described above, the facet of the first waveguide and/or the second waveguide may be arranged on the edge of the chip. In this case, the first waveguide and the second waveguide fuse at the edge of the chip. Thus, light emitted by the first waveguide and the second waveguide leaves the chip and may propagate in air or in other optical means for guiding light. For example, the light emitted by the first waveguide and the second waveguide may be coupled into another waveguide or an optical fiber for directing the light beams to the sample and/or the photodetector.

The facet or the plane surface of the facet may be inclined to a direction of extension of the first waveguide by $\alpha/2$, for example by 22.5°. If the second waveguide is inclined to the first waveguide by 45°, the facet includes an angle of angle $\alpha/2$ with the second waveguide and/or the first waveguide, e.g. 22.5° to the direction of extension of the second waveguide. Please note that the direction of extension refers to the immediate section before the beam splitter in case of a curved or bended waveguide. In case of a straight waveguide, the direction of extension corresponds to the direction of extension of the complete waveguide.

In the arrangement described above, light propagating in the first waveguide and coming from the light source may transmit through the beam splitter and propagate further to the sample. Additionally, light coming from the first waveguide is reflected into the second waveguide by the beam splitter. Light reflected back by the sample may be reflected by the beam splitter to the photodetector. Thus, the photodetector is arranged to receive light reflected by the beam splitter and coming from the sample.

The optical device may comprise a reflector such as a distributed Bragg reflector (DBR) which is coupled to the second waveguide. The reflector is configured to (completely) reflect light that is reflected by the beam splitter into the second waveguide. For example, the reflector is arranged in direct contact with the end face of the second waveguide.

The light reflected by the reflector again impinges on the beam splitter. The transmitted proportion of the light reflected by the reflector is guided/routed to the photodetector. These light beams constitute the local oscillator and interfere with the light beams reflected by the sample and by the beam splitter on the photodetector. Thus, the first waveguide and the second waveguide form a first arm and a second arm, respectively, of the Michaelson interferometer. The optical path between the beam splitter and the sample forms the third arm of the Michaelson interferometer. The optical path between the beam splitter and the photodetector forms the fourth arm of the Michaelson interferometer.

Optionally, the photodetector may be arranged in a direction of extension of the second waveguide. Thus, light that is reflected by the reflector and transmitted at the beam splitter may straightly propagate to the photodetector. In this case, the light impinging on the photodetector and coming from the second waveguide may freely propagate, for example in air without any optical components. However, optical elements such as waveguides, optical fibers, mirrors and the like, may be provided to guide the light coming from the second waveguide and transmitted by the beam splitter to the photodetector.

The sample lens may also be provided with this embodiment and is optionally arranged remote or offset from the chip. The sample lens which may include a plurality of lenses is provided for focusing and/or directing light coming from the first waveguide and transmitted by the beam splitter onto the sample. Conversely, the sample lens may focus light scattered back from the sample onto the beam splitter. For example, light beams coming from the first waveguide may be parallel to each other and the sample lens focuses the light beams onto the sample.

In an alternative embodiment, the reflector is replaced by a photodetector. The photodetector may be coupled to the second waveguide; for example the photodetector is arranged in direct contact with the end of the second waveguide. The photodetector may be arranged on the chip. However, as elaborated above, optical components may be provided for guiding the light emitted by the second waveguide to the photodetector. In this case, the photodetector may be arranged remote or external to the chip. This may help to use more bulky photodetectors which may have increased resolution in the spatial and/or temporal domain. Here again, the optical path from the beam splitter through the second waveguide to photodetector corresponds to an arm of the Michaelson interferometer. In particular, the light coming from the first waveguide and reflected by the beam splitter into the second waveguide forms the local oscillator.

In this embodiment, a first lens may be provided which focuses and/or directs light coming from the first waveguide and transmitted by the beam splitter onto the sample. The first lens may include a plurality of lenses and form a lens system. The first lens may have the same features and characteristics as the sample lens described above. The optical path from the beam splitter through the first lens to the sample defines an arm of the Michaelson interferometer.

The optical device may further comprise a second lens which is arranged and configured to focus light back scattered from the sample into the second waveguide. The second lens may include a plurality of lenses or a lens system and is spatially offset to this first lens; the first lens and the second lens are spaced apart.

Further optical components may be provided to direct the light from the sample to the second lens and/or from the second lens to the beam splitter and, thus, into the second waveguide. The second lens and/or the further optical components may focus light scattered back from the sample onto the beam splitter, for example in such a way that the back scattered light impinges perpendicular to the outer surface of the beam splitter. The optical path from the sample through the second lens to the beam splitter forms an arm of the Michaelson interferometer.

The light propagating through the second lens and through the beam splitter interferes with the light coming from the first waveguide and reflected by the beam splitter on the photodetector.

The first lens and/or the second lens may be arranged spaced apart from the chip.

Referring to FIG. 1, an optical device 100 includes a chip 102, a beam splitter 104, a first wave guide 110, and a second waveguide 117. The first waveguide 110 and the second waveguide 117 are arranged on the chip 102. The chip 102 may be a waveguide silicon photonics (SiPh) platform or silicon on oxide chip (or silicon on insulator (SOI) chip. The first waveguide 110 may be coupled to a light source 105. The first waveguide 110 may be arranged to propagate light coming from the light source 105 which is indicated by the arrow 1.

The first waveguide 110, the second waveguide 117 and a common waveguide 122 are coupled to each other by a coupler 115 which may be a Y-branch coupler or a directional coupler. The coupler 115 may be configured to couple light coming from the first waveguide 110 and/or the second waveguide 117 into the common waveguide 122. This is indicated by the arrow 2. In addition, the coupler 115 may be configured to couple light coming from the common waveguide 122 into the first waveguide 110 and/or the second waveguide 117. In particular, the coupler 115 is configured to couple light coming from the common waveguide 122 into the second waveguide 117. This is indicated by the arrow 4. The coupler 115 is arranged on the chip 102.

The optical device 100 may further include a photodetector 120 which may be arranged on the chip 102. The photodetector 120 may be directly coupled to the second waveguide 117. The photodetector 120 may be an AC coupled photodiode or a focal plane array detector The beam splitter 104 may be arranged on the chip 102 and is optionally provided as a facet or launch facet of the common waveguide 122. In particular, the facet is an end face of the common waveguide 122. The facet may be perpendicular to the direction of extension of the common waveguide 122. The facet may be provided with a reflective coating in order to set the ratio of reflection and transmission. However, it is also possible that the facet may be inclined to the direction of extension of the common waveguide 122 to control the reflectivity of the beam splitter 104.

The beam splitter 104 is configured to reflect some of the impinging light, for example light coming from the first waveguide 110 (indicated by arrow 1) while the not reflected proportion of the impinging light is transmitted. The reflected proportion of the impinging light is indicated by the arrow 3.

The light transmitted by the beam splitter 104 may be directed on to a sample 124 by a sample lens 126. This is indicated by arrow 5. The light impinging on the sample 124 is reflected back by the sample 126 and is focused by the sample lens 126 onto the beam splitter 104. This is indicated by arrow 6. The light transmitted by the beam splitter 104 and coming from the sample 124 is coupled into the second waveguide 117 by the coupler 115 and interferes with the light indicated by arrow 4 on the photodetector 120.

The first waveguide 110 and the common waveguide 122 form an arm of a Michaelson interferometer (arrows 1 and 2). The common waveguide 122 and the second waveguide 117 form another arm of the Michaelson interferometer and in particular the local oscillator (see arrows 3 and 4). A further arm of the Michaelson interferometer is constituted by the optical path between the beam splitter 104 and the sample 124. The fourth arm of the Michaelson interferometer is the optical path from the sample 124 through the beam splitter 104 and the common waveguide 122 to the second waveguide 117.

The optical device 100 may further include a light source controller 128 which may be arranged external to the chip 102 and connected to the light source 105. The light source controller 128 is configured to control the light source 105 and, thus, the light emitted by the light source 105. For example, the light source controller 128 controls the frequency of variation of the wavelength of the light generated by the light source 105.

The optical device 100 may also include an analysis device 130 which is connected to the photodetector 120. The analysis device 130 may be arranged external to the chip 102. The analysis device 130 may include a processor and/or other electrical components for analyzing the interference pattern detected by the photodetector 120.

The embodiment of FIG. 1 may be additionally or alternatively described as follows: the light source (laser) 105 is connected to the first (transmitting) waveguide 110, which is in turn connected to a first branch of a Y-branch coupler 115. The light source 105 may include a phase modulated laser or a chirped laser, or a frequency-shifted laser. The common branch of the Y-branch coupler 115 ends at a facet (or "launch facet") at which the outgoing light is launched into free space. The launch facet may be an angled facet to control its reflectivity, or it may be a straight facet, as shown. A portion of the outgoing light is reflected from the launch facet into the second branch of the Y-branch coupler 115 (and, thus, into the second waveguide 117) and onto the AC coupled photodiode or photodetector 120, where this portion of the outgoing light acts as the local oscillator for a heterodyne interferometry measurement. The local oscillator (i.e., the reflected portion of the outgoing light) is mixed with the received light, an off-chip back reflected (or "backscattered") probe beam, to create a beat tone signal at a frequency corresponding to the wavelength difference between the local oscillator signal and the earlier-generated backscattered light. The beat tone signal is then detected by the photodiode or photodetector 120. The system may include a lens (the sample lens 126) between the launch facet and the sample 124, as shown.

The launch facet acts like a beam splitter, creating a Michelson interferometer with two arms on-chip and two arms in free space, in contrast with related art on-chip heterodyne interferometers that use a Mach-Zehnder interferometer.

Figure 2:
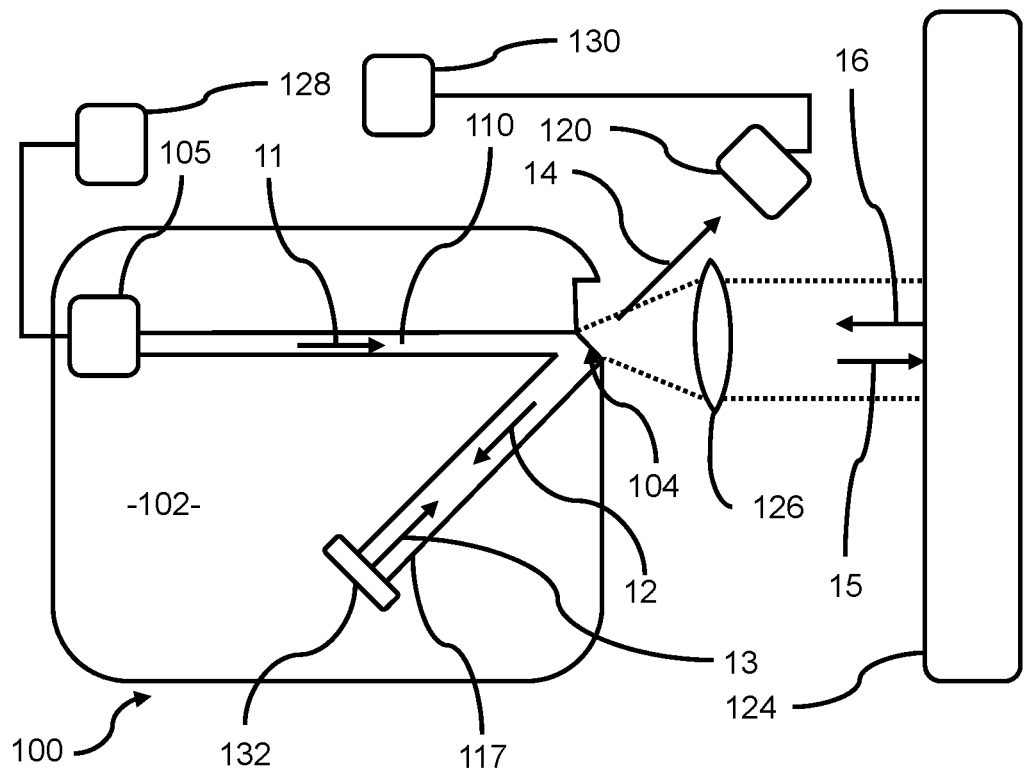
FIG. 2 is a schematic representation of an optical device for heterodyne interferometry according to a second embodiment of the present invention.

Another embodiment of the optical device 100 is depicted in FIG. 2 which shares the same feature and characteristics as the embodiment of the optical device 100 depicted in FIG. 1 except for the following differences:

The optical device 100 depicted in FIG. 2 does not include the coupler 115 and the common waveguide 122. Instead, the first waveguide 110 and the second waveguide 117 intersect or fuse at or in front of the beam splitter 104. The first waveguide 110 and the second waveguide 117 may be straight. The beam splitter 104 may be a facet of the first waveguide 110 and the second waveguide 117. In particular, the beam splitter 104 is configured to reflect light propagating in the first waveguide 110 into the second waveguide 117. Thus, some of the light beams indicated by arrow 11 are reflected by the beam splitter 104 into the second waveguide 117 indicated by the arrow 12.

Unlike the optical device 100 depicted in FIG. 1, the second waveguide 117 does not terminate in a photodetector 120 but in a reflector 132 which may include a distributed Bragg reflector (DBR). Thus, light propagating in the second waveguide 117 and coming from the beam splitter 104 (indicated by the arrow 12) is reflected at the reflector 132 (indicated by the arrow 13) back to the beam splitter 104. The beam splitter 104 transmits at least part of the light reflected by the reflector 134 which is guided to the photodetector 120 (indicated by arrow 14). The photodetector 120 is arranged external to the chip 102.

Similar to the optical device 100 depicted in FIG. 1, the light coming from the first waveguide 110 and transmitted by the beam splitter 104 leaves the chip 102 and propagates in the free space to the sample 124 (indicated by arrow 15). Thereby, the light may be focused by the sample lens 126. The light reflected by the sample 124 is focused on the beam splitter 104 by the sample lens 126 (indicated by arrow 16). The beam splitter 104 is configured and arranged to reflect the light indicated by arrow 16 onto the photodetector 120. The light reflected by the sample 124 interferes with the light reflected by the reflector 132 on the photodetector 120.

The first waveguide 110 and the second waveguide 117 define two arms of the Michaelson interferometer which are arranged on the chip 102. Another arm of the Michaelson interferometer is the optical path between the beam splitter 104 and the sample 124. The fourth arm of the Michaelson interferometer includes the optical path between the beam splitter 104 and the photodetector 120.

The embodiment of FIG. 2 may be additionally or alternatively described as follows: the photodetector 120 (e.g., a photodiode) is off-chip. The local oscillator signal reaches the photodetector 120 after (i) being reflected from the inner surface of the beam splitter (launch facet) 104, (ii) being reflected from the distributed Bragg reflector 132, and (iii) being transmitted through the beam splitter (launch facet) 104. The probe light reaches the photodetector 120 after (i) being transmitted through the launch facet, (ii) being transmitted through the sample lens 124 a first time, (iii) being reflected (or "backscattered") from the sample 124, (iv) being transmitted through the sample lens 124 a second time, and (v) being reflected from the outer surface of the beam splitter (launch facet) 104.

Figure 3:
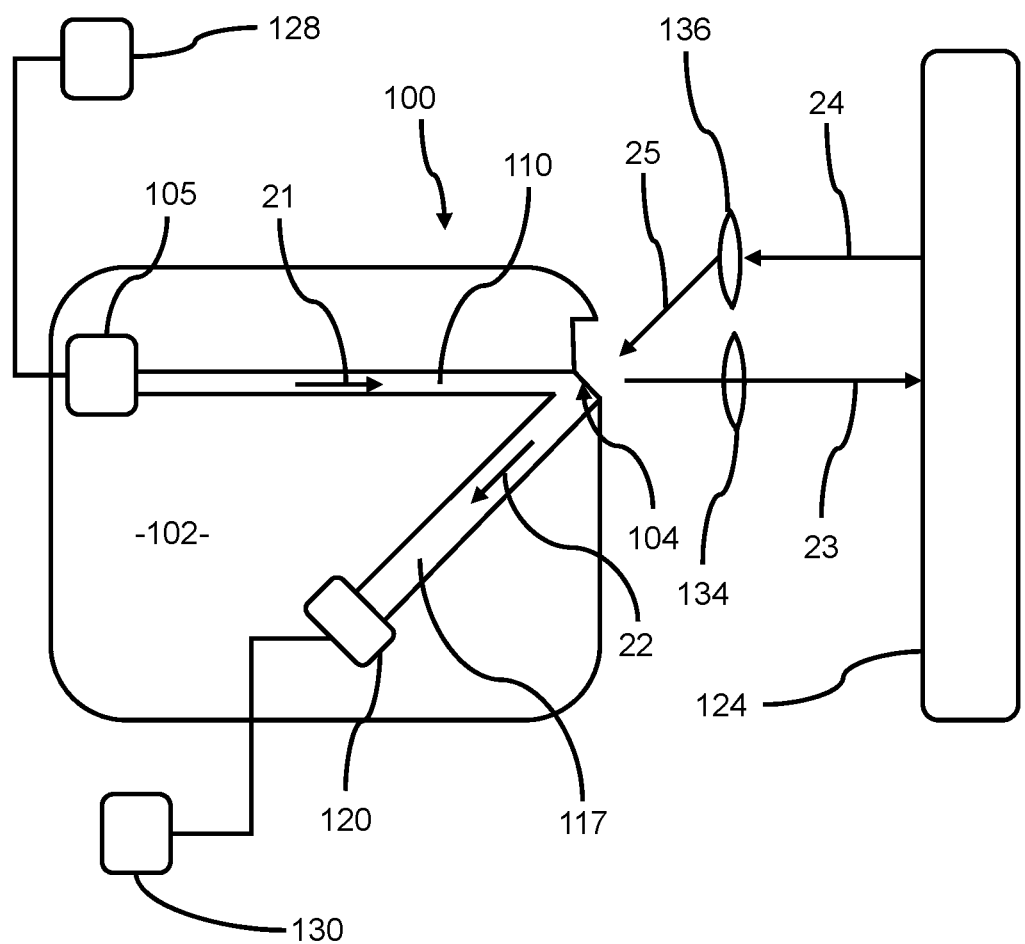
FIG. 3 is a schematic representation of an optical device for heterodyne interferometry according to a third embodiment of the present invention.

Another embodiment of the optical device 100 is depicted in FIG. 3 which shares the same feature and characteristics as the embodiment of the optical device 100 depicted in FIG. 2 except for the following differences:

In this embodiment, the reflector 132 is replaced by the photodetector 120 similar to the embodiment depicted in FIG. 1. The photodetector 120 is arranged on the chip 102.

In the embodiment depicted in FIG. 3, the sample lens 126 is omitted and replaced by a first lens 134 and a second lens 136. The first lens 134 is provided for focusing or directing light coming from the first waveguide (depicted by arrow 21) and transmitted by the beam splitter 104 onto the sample 124 (indicated by arrow 23). The light scattered back by the sample 124 (indicated by arrow 24) is focused and/or directed to the beam splitter 104 and into the second waveguide 117 (indicated by arrow 25) by the second lens 136.

Similar to the embodiment depicted in FIG. 2, light propagates in the first waveguide 110 and is reflected by the beam splitter 104 into the second waveguide 117 (indicated as arrow 22). The light indicated by arrow 22 forms the local oscillator and interferes with the light back scattered by the sample 124 and focused/directed by the second lens 136 on the photodetector 120.

The first waveguide 110 and the second waveguide 117 define two arms of the Michaelson interferometer which are arranged on the chip 102. Another arm of the Michaelson interferometer is the optical path between the beam splitter 104 and the sample 124 (through the first lens 134). The fourth arm of the Michaelson interferometer is the optical path between the sample 124 through the second lens 136 to the beam splitter 104.

The embodiment of FIG. 3 may be additionally or alternatively described as follows: this embodiment has separate transmit and receive paths. The local oscillator signal reaches the photodetector 120 after being reflected from the inner surface of the beam splitter (launch facet) 120 (as in the embodiment of FIG. 1). The probe signal reaches the photodetector 120 after (i) being transmitted through the beam splitter (launch facet) 120, (ii) being transmitted through a first lens 134, (iii) being reflected (or "backscattered") from the sample 124, (iv) being transmitted through a second lens 136, and (v) being transmitted through the launch facet into the waveguide connected to the photodetector. As is the case in the embodiment of FIG. 1, in the embodiments of FIGS. 2 and 3, the light source (laser) 105 may have a time-varying wavelength so that a beat tone is created by the mixing of the backscattered probe light and the local oscillator signal, and the beat tone may be detected by the photodetector (which may, as in the embodiment of FIG. 1, be an AC coupled photodiode).

The configurations of the embodiments of the optical devices 100 of FIGS. 1 to 3 may mitigate or solve the problem of beat tone signal degradation for integrated optical heterodyne detection methods that, in other configurations, may be caused by on-chip phase noise experienced by separate local oscillator and probe beam paths.

What is claimed is:

1. An optical device for heterodyne interferometry, comprising:
    a chip,
    a beam splitter,
    a first waveguide arranged on the chip and configured to guide light propagating in the first waveguide to the beam splitter, and
    a second waveguide arranged on the chip and configured to guide light propagating in the second waveguide to the beam splitter,
    wherein the beam splitter, the first waveguide, and the second waveguide form part of a Michelson interferometer,
    wherein the first waveguide and the second waveguide at least partially form two arms of the Michelson interferometer,
    wherein two further arms of the Michelson interferometer are at least partially arranged outside the chip, and
    wherein the first waveguide and the second waveguide physically combine at the beam splitter or at a coupler.

2. The optical device of claim 1, wherein the beam splitter is arranged on the chip.

3. The optical device of claim 2, wherein the first waveguide and the second waveguide physically combine at the beam splitter.

4. The optical device of claim 3, wherein the beam splitter is a facet of the first waveguide and/or the second waveguide.

5. The optical device of claim 4, wherein the facet is inclined to a direction of extension of the first waveguide.

6. The optical device of claim 3, further comprising a reflector coupled to the second waveguide and/or a photodetector.

7. The optical device of claim 6, wherein the reflector is arranged on the chip.

8. The optical device of claim 7, wherein the reflector is a distributed Bragg reflector (DBR).

9. The optical device of claim 6, wherein the photodetector is arranged to receive light from the second waveguide.

10. The optical device of claim 3, further comprising a photodetector coupled to the second waveguide and arranged on the chip.

11. The optical device of claim 10, further comprising a first lens configured to focus and/or direct light coming from the first waveguide onto a sample and a second lens configured to focus light backscattered from the sample into the second waveguide.

12. The optical device of claim 11, wherein the first lens and/or the second lens are arranged spaced apart from the chip.

13. The optical device of claim 2, wherein the beam splitter is a facet of a waveguide arranged on the chip.

14. The optical device of claim 1, further comprising a light source coupled to the first waveguide.

15. The optical device of claim 14, wherein the light source is arranged on the chip and/or the light source is configured to generate light having time-varying wavelength.

16. The optical device of claim 1, further comprising the coupler, wherein the coupler is configured to couple the light of the first waveguide and the second waveguide, and to guide the coupled light of the first waveguide and the second waveguide to the beam splitter.

17. The optical device of claim 16, further comprising a common waveguide coupled to the coupler and arranged on the chip.

18. The optical device of claim 17, wherein the beam splitter is a facet of the common waveguide.

19. The optical device of claim 16, further comprising a photodetector coupled to the second waveguide.

20. The optical device of claim 19, wherein the photodetector is arranged on the chip.

21. The optical device of claim 16, wherein the coupler is a Y-branch coupler.

22. The optical device of claim 1, further comprising a sample lens configured to focus and/or direct light from the first waveguide onto a sample.

23. The optical device of claim 22, wherein the sample lens is arranged spaced apart from the chip.

* * * * *